United States Patent

[11] 3,616,233

| [72] | Inventor | Hans Schleich<br>Staten Island, N.Y. |
|---|---|---|
| [21] | Appl. No. | 800,696 |
| [22] | Filed | Feb. 19, 1969 |
| [45] | Patented | Oct. 26, 1971 |
| [73] | Assignee | Baxter Laboratories, Inc.<br>Morton Grove, Ill. |

[54] REMOVING ESTERASE FROM MICROBIAL RENNIN
13 Claims, No Drawings

[52] U.S. Cl. .................................................. 195/66, 195/118, 195/124
[51] Int. Cl. .................................................. C07g 7/02
[50] Field of Search ........................................... 195/62, 63, 66, 68, 118, 124, 128

[56] References Cited
UNITED STATES PATENTS

| 3,151,039 | 9/1964 | Atima et al. .............. | 195/62 |
|---|---|---|---|
| 3,366,483 | 1/1968 | Stone ..................... | 99/48 |

FOREIGN PATENTS

| 1,108,287 | 4/1968 | Great Britain .............. | 195/62 |

OTHER REFERENCES

Dixon et al., Enzymes, Academic Press Inc. N.Y. 2 nd ed. 1964 (pages 35–37), Q P 601. D 5c C.2

*Primary Examiner*—Lionel M. Shapiro
*Assistant Examiner*—D. M. Naff
*Attorneys*—Walter C. Kehm and W. Garrettson Ellis

ABSTRACT: Esterase is removed from microbial rennin by acidifying the rennin to a pH of about 2.0 to 3.5 and maintaining the rennin at a temperature of about 20° C. to 55° C. until the esterase is decomposed. Thereafter, the rennin is preferably neutralized to a pH of at least about 4 to inhibit its decomposition.

REMOVING ESTERASE FROM MICROBIAL RENNIN

BACKGROUND OF THE INVENTION

Rennin is an enzyme which is obtained from the fourth stomach of a calf or lamb, and which is used as an agent for coagulating milk in the production of cheese.

Rennin is an expensive material, and its supply is limited by the available supply of calf or lamb carcasses on the market. Furthermore, the characteristics and quality of natural rennin are variable, depending in part on the type of calf or lamb from which the rennin is obtained, as well as the manner in which the animal is raised. Thus, it is generally difficult for a user of rennin to closely control the quality of the rennin he uses, since commercially available rennin can only be obtained from those carcasses which happen to be available on the market at any given time.

Attempts have been made to find a substitute for natural rennin. Through this work, it has been found that certain micro-organisms produce milk clotting protease enzymes having characteristics similar to rennin. Among these are the organisms *Mucor miehei, Mucor pusillus, Bacillus cereus,* and *Endothia parasitica*. Various renninlike proteases produced by such micro-organisms show promise as milk clotting agents for use in cheese making as substitutes for natural rennin. These renninlike proteases, called microbial rennins, exhibit advantages over natural rennin in their lower cost and in the fact that they can be easily prepared under standardized conditions, resulting in a uniform product which gives undeviating results in the preparation of cheese and other coagulated milk products.

A disadvantage, however, which has been found in many of the microbial rennins is the fact that an esterase or lipase by-product is produced in conjunction therewith. The esterase tends to decompose the triglycerides present in the milk which is coagulated, yielding free organic acids such as butyric acid. This can impart a rancid flavor, which is undesirable in many cheese products. Moreover, the small amounts of esterase present can only be removed conventionally from the microbial rennin by difficult, expensive, and time-consuming methods of separation.

DESCRIPTION OF THE INVENTION

This invention relates to a method of removing esterase from microbial rennin in a simple, rapid, and inexpensive operation, while retaining a high yield of the desired rennin.

In accordance with this invention, esterase is removed from a microbial rennin by acidifying the rennin to a pH of about 2.0 to 3.5 and maintaining the rennin at a temperature of about 20° C. to 55° C., for a period of time sufficient to decompose at least a portion of the esterase present.

Typically, microbial rennin has a pH of about 4 or above. While not desiring to be limited to any theoretical mode of operation of the process of this invention, it has been found that at a pH of 2.0 to 3.5, in the temperature range stated above, the esterase present exhibits a significantly lower stability than the microbial rennin. Thus the esterase is selectively destroyed, while the rennin generally suffers only a slightly diminished yield. After the esterase content is reduced to an acceptable level, the pH of the mixture is generally raised to at least about 4, and typically no higher than about 8, to inhibit further decomposition of the microbial rennin present.

It is preferred for the microbial rennin to be maintained at a pH of 2.0 to 3.5 and a temperature of 20° C. to 55° C. for a period of about ½ to 5 hours. Generally, temperatures of about 25° C. to 40° C. are used when the pH is between 2.3 and 2.5, and these reaction conditions are typically maintained for a period of about 1 to 5 hours. When the microbial rennin has a pH of 2.5 to 3, a temperature of about 40° to 50° C. is typically used, and the reaction conditions maintained for a period of about 1 to 5 hours. It can be seen that the lower temperatures are generally used in conjunction with a lower pH, while a higher pH is usually maintained at higher temperatures.

The microbial rennin can be acidified with any acidic material which is suitable for human ingestion in trace amounts. Typically, hydrochloric acid is used, but other acids such as sulfuric acid, citric acid, ascorbic acid, phosphoric acid, acetic acid, or tartaric acid can be used. Acidic salts such as aluminum chloride or ferric chloride can also be used.

After decomposition of the esterase is complete, the microbial rennin is preferably neutralized to a pH of at least 4 by adding an alkali which is suitable for human ingestion in trace amounts e.g., sodium hydroxide, ammonium hydroxide, sodium carbonate, potassium bicarbonate, or calcium hydroxide.

The material used in the process of this invention is prepared by a fermentation with a micro-organism to yield a major amount of microbial rennin and a minor amount of esterase relative to each other, based upon the presence of rennin and esterase activity units (defined below). It is preferred for the material which is used in the process of this invention to be prepared by fermentation with an organism of the order Mucorales, and typically of the family Mucoraceae. Organisms from the latter family which are of genus *Rhizopus* and genus *Mucor* are contemplated for use, including *Mucor pusillus* and *Mucor miehei*.

A superior microbial rennin can be prepared by fermentation of a nutrient with an active strain of the organism *Mucor miehei*. One very effective strain of this organism is on deposit with the Northern Regional Research Laboratories at Peoria, Illinois, and available to the public under the code designation NRRL A7772. Other strains of the same organism which are similarly available are designated NRRL 3169, NRRL A13131, NRRL 13042, and NRRL 2543. Another suitable strain of *Mucor miehei* is described in Belgian Pat. No. 690,571. Some strains of these organisms, however, produce only trace amounts of renninlike protease, if any, and thus their fermentation products are not suitable for use in the process of this invention. One such organism is *Mucor miehei*, strain NRRL A6588.

Conventional nutrients for culturing micro-organisms are used to prepare the desired rennin-like protease. Typical nutrients contain such materials as fresh or dried whey, cornstarch, sugars such as glucose, flours such as soybean flour or wheat flour, and vitamins and trace minerals as needed. The nutrient is utilized in a aqueous medium.

The following examples are for illustrative purposes only and should not be construed as limiting the scope of the present invention, which is defined in the claims below.

EXAMPLE 1

*Mucor miehei* NRRL A7772, is transferred from an agar slant under sterile conditions to a one liter Fernbach flask containing 200 ml. of the following aqueous medium:

| | |
|---|---|
| Fresh whey | 82 wt. % |
| Degraded Cornstarch | 5 wt. % |
| Brewer's Yeast | 1 wt. % |
| Glucose | 1 wt. % |
| Water | 11 wt. % |
| Total: | 100 % |

The flask is incubated under aerobic conditions on a rotary shaker at 37° C. for 168 hours. The fermention broth is filtered to remove living organisms. The filtrate shows a high concentration of a microbial rennin.

To the chilled filtrate (less than 5° C.) there is added two volumes of cold acetone. The resultant precipitate is filtered and washed with acetone, yielding a fine white powder containing a high concentration of microbial rennin.

DETERMINATION OF RENNIN CONTENT

To 20 grams of Carnation Instant Non-fat Dry Milk there is added 180 ml. of 0.01 M calcium chloride solution. This is blended in a Waring blender for 15 seconds.

Five ml. of the above milk solution is heated to 35° C. in a water bath. There is added to this 0.5 ml. of a water solution containing the microbial rennin. The resulting mixture is stirred, and the time of clotting of the milk solution is noted. The concentration of rennin is then calculated in arbitrarily selected rennin activity units in which one rennin activity unit equals that amount of rennin which clots the milk under the conditions described above in 85 seconds. The number of rennin activity units present in the above test are inversely proportional to the amount of time taken to clot the milk. From this data, the concentration of microbial rennin is determinable in the powdered product prepared above and in solutions thereof.

DETERMINATION OF ESTERASE CONTENT

The exterase content of a solution of microbial rennin is determined as follows: to 114 ml. of 0.05 M sodium acetate solution there is added 13 grams of gum arabic U.S.P. About 50 mg. of thymol is also added to the above mixture, which is stirred for 25 minutes to dissolve all ingredients. To this there is then added 22.7 g. of tributyrin (the tributyl ester of glycerine). The resulting mixture is then emulsified in a Waring blender for five minutes. A trace of sodium hydroxide solution is then added to provide the emulsion with a pH of 6.

Fifty ml. of the above-prepared emulsion is placed in a 125 ml. Erlenmeyer flask. Ten ml. of a solution of microbial rennin is then added and quickly mixed. A 10.0 ml. aliquot of the resulting mixture is immediately removed, added to 40 ml. of water, and immediately titrated with 0.02 N sodium hydroxide to pH 8.7. The remaining mixture is maintained at the temperature of 37° C. in a bath with continuous stirring.

Exactly 40 minutes after adding the rennin to the emulsion, another 10.0 ml. aliquot is removed from the Erlenmeyer flask, placed in 40 ml. of water, and titrated with the same sodium hydroxide solution to pH 8.7. The difference between the sodium hydroxide consumed in the two titrations expresses the amount of tributyrin which has been hydrolyzed by the esterase present in the microbial rennin.

The units of esterase activity are selected so that one unit of esterase activity is that amount of esterase which releases one microequivalent of butyric acid from tributyrin per minute under the conditions of the test.

REMOVAL OF ESTERASE FROM THE MICROBIAL RENNIN

A solution of the microbial rennin prepared above, which contains a minor but detectable amount of esterase, was mixed with a small amount of dilute hydrochloric acid to provide the mixture with a pH of 2.4. The mixture was heated at a temperature of 30° C. for a period of 4 hours. Following this, sufficient sodium hydroxide solution was added to provide a pH of 4 to the mixture, stabilizing the microbial rennin.

Measurement of the rennin activity and esterase activity units present in the mixture immediately before and after the above heating step indicated that 95 percent of the esterase had been destroyed in the mixture during the heating step, while only 14 percent of the microbial rennin was destroyed. The resulting product was thus essentially free of esterase while still possessing a high concentration of microbial rennin.

The resulting microbial rennin was suitable for coagulating milk for the production of cheese.

EXAMPLE 2

A filtered and evaporated fermentation solution was prepared from fermenting *Mucor miehei*. The product contained a major amount of microbial rennin and a minor amount of esterase, having a density of 27° Be., a rennin activity of 173 rennin units per gram, an esterase activity of 6.8 esterase units per gram (both units being defined in example 1), and a pH of 4.0 Forty grams of the above mixture were acidified with about 4.4 ml. of 1 N hydrochloric acid to a pH of 2.5. The mixture was then placed in a water bath at 45° C. Aliquots for analysis were removed after 30 minutes, 60 minutes, and 120 minutes of immersion in the water bath. The rennin activity and esterase activity of each sample was measured, and is shown below:

| Time of Heating | Rennin Activity (Units per gram) | Esterase Activity (Units per gram) |
| --- | --- | --- |
| 0 minutes | 173 | 6.8 |
| 30 minutes | 165 | 1.27 |
| 60 minutes | 160 | 0.63 |
| 120 minutes | 158 | 0.27 |

EXAMPLE 3

Each of five new samples of the fermentation product of example 2 were taken and acidified with hydrochloric acid to a pH shown below. Each sample was then heated for 90 minutes at a temperature shown below. The percentage decomposition of esterase and microbial rennin during the 90 minutes heating is shown in each case:

| | pH | Temperature | Decrease in Rennin Activity Units (%) | Decrease in Esterase Activity Units (%) |
| --- | --- | --- | --- | --- |
| Sample 1 | 2.3 | 45° C. | 24 | 92 |
| Sample 2 | 2.5 | 45° C. | 8 | 95 |
| Sample 3 | 2.6 | 43° C. | 0 | 86 |
| Sample 4 | 2.6 | 47° C. | 0 | 92 |
| Sample 5 | 2.7 | 45° C. | 2 | 88 |

EXAMPLE 4 a. An evaporated solution of microbial rennin was prepared by fermentation with *Mucor miehei*. The product contained a minor amount of esterase, and had 272 rennin activity units per gram and 25.8 esterase activity units per gram. Dilute hydrochloric acid was added to provide a pH of 3 to the mixture, which was then heated at 55° C. for 5 minutes. After this period, it was determined that 89.3 percent of the esterase present had been destroyed, while only 5 percent of the rennin present was destroyed. Thus the resulting product had a greatly reduced esterase content and only a slightly reduced content of microbial rennin.

b. Another sample of the above microbial rennin solution was acidified with dilute hydrochloric acid to a pH of 3.5, and then heated at 50° C. for 60 minutes. Following this heating period, it was determined that the lipase content of the mixture was reduced by 16 percent while no reduction in the content of the microbial rennin was detected.

EXAMPLE 5

A filtered and evaporated fermentation solution was prepared from growing *Mucor miehei*. The product contained microbial rennin and lipase, and had a density of 26.5° Be., a rennin activity of 118 rennin units per gram, an esterase activity of 4.7 esterase units per gram, and a pH of 4.3. Two hundred grams of the above mixture were acidified to a pH of 2.6 with about 9 ml. of 2N hydrochloric acid. The mixture was then heated for 90 minutes at 44° C.

After this heating period, the mixture was cooled to 25° C. and the remainder of the mixture neutralized to pH of 4.0 by addition of about 8.5 ml. of 2N sodium hydroxide.

Determination of the rennin and esterase activities shown that 91 percent of the esterase had been destroyed during the above heating step while only 8 percent of the microbial rennin was destroyed.

EXAMPLE b 6

An evaporated fermentation solution was prepared from growing *Mucor miehei*. The product had a rennin activity of 276 units per gram, an esterase activity of 26 units per gram, and a pH of 5.

Sufficient 2N hydrochloric acid was added to a sample of the mash to provide a pH of 2.0. The product was maintained at 20° C. for three hours, with portions being taken from the sample every hour, adjusted to pH 4, and analyzed for rennin and esterase activity.

The results were:

| Time of reaction | Decrease in Rennin Activity Units (%) | Decrease in Esterase Activity Units (%) |
| --- | --- | --- |
| 1 hr. | 11 | 63 |
| 2 hrs. | 13 | 77 |
| 3 hrs. | 17 | 82 |

What is claimed is:

1. The process of removing esterase from a microbial rennin previously prepared by fermentation with a micro-organism culture of the genus Mucor to produce a major amount of microbial rennin at a pH of at least about 4, and a minor amount of esterase, which process comprises acidifying said microbial rennin to a pH of about 2.0 to 3.5 and maintaining said rennin at a temperature of about 20° to 55° C. for a period of time sufficient to destroy a substantial portion of the esterase present.

2. The process of claim 1 in which said rennin is separated from said micro-organism culture prior to said acidifying.

3. The process of claim 1 in which said microbial rennin is neutralized to a pH of at least about 4 after said esterase is destroyed, to inhibit decomposition of said rennin.

4. The process of claim 1 in which said rennin is maintained at a ph of 2.0 to 3.5 and a temperature of 20° to 55° C. for a period of ½ to 5 hours.

5. The process of claim 4 in which said rennin is maintained at a pH of 2.5 to 3 and a temperature between 40° to 50° C. for a period of 1 to 5 hours.

6. The process of claim 4 in which said rennin is maintained at a pH of 2.3 to 2.5 and a temperature of 25° to 40° C. for a period of 1 to 5 hours.

7. The process of claim 1 in which said rennin is prepared from the organism *Mucor miehei*.

8. The process of removing an esterase from a microbial rennin previously prepared by aerobically fermenting a nutrient with a culture of the organism *Mucor miehei* to produce a rennin mixed with an esterase at a pH of at least about 4, which comprises acidifying the rennin and esterase thereby produced to a pH of 2.0 to 3.5 and maintaining said rennin at a temperature of 20° to 55° C. for a period of time sufficient to destroy a substantial portion of the esterase present.

9. The process of claim 8 in which said rennin is separated from said culture prior to said acidifying.

10. The process of claim 8 in which said rennin is neutralized to provide a pH of at least about 4 after said esterase is destroyed, to inhibit decomposition of said rennin.

11. The process of claim 8 in which said rennin is maintained at a pH of 2.0 to 3.5 and a temperature of 20° to 55° C. for a period of ½ to 5 hours.

12. The process of claim 11 in which said rennin is maintained at a pH of 2.5 to 3 and a temperature of 40° to 50° C. for a period of 1 to 5 hours.

13. The process of claim 11 in which said rennin is maintained at a pH of 2.3 to 2.5 and a temperature of 25° to 40° C. for a period of 1 to 5 hours.

* * * * *